US012440225B2

United States Patent
Elsawah et al.

(10) Patent No.: US 12,440,225 B2
(45) Date of Patent: Oct. 14, 2025

(54) SURGICAL ARRAY STABILIZERS, AND RELATED SYSTEMS AND METHODS

(71) Applicant: Medos International Sarl, Le Locle (CH)

(72) Inventors: Lamis Elsawah, King of Prussia, PA (US); William Miller, Middleboro, MA (US); Michael Sorrenti, Middleboro, MA (US); Christopher Cromer, Boston, MA (US); Eric Biester, Raynham, MA (US); Vanessa Howell, Redwood City, CA (US)

(73) Assignee: Medos International Sarl, Le Locle (CH)

( * ) Notice: Subject to any disclaimer, the term of this patent is extended or adjusted under 35 U.S.C. 154(b) by 419 days.

(21) Appl. No.: 17/819,954

(22) Filed: Aug. 16, 2022

(65) Prior Publication Data

US 2023/0047595 A1  Feb. 16, 2023

Related U.S. Application Data

(60) Provisional application No. 63/233,350, filed on Aug. 16, 2021.

(51) Int. Cl.
| | |
|---|---|
| *A61B 17/16* | (2006.01) |
| *A61B 17/17* | (2006.01) |
| *A61B 90/00* | (2016.01) |
| A61B 17/00 | (2006.01) |
| A61B 34/20 | (2016.01) |

(52) U.S. Cl.
CPC ...... *A61B 17/1633* (2013.01); *A61B 17/1703* (2013.01); *A61B 2017/00486* (2013.01); *A61B 17/1615* (2013.01); *A61B 2034/2072* (2016.02); *A61B 2090/3983* (2016.02)

(58) Field of Classification Search
CPC .... A61B 2090/3983; A61B 2034/2072; A61B 17/1615
See application file for complete search history.

(56) References Cited

U.S. PATENT DOCUMENTS

| | | | |
|---|---|---|---|
| 5,871,493 A | * | 2/1999 | Sjostrom .......... A61B 17/32002 606/180 |
| 7,995,827 B2 | | 8/2011 | Wagner et al. |
| 8,961,500 B2 | | 2/2015 | DiCorleto et al. |
| 9,084,635 B2 | | 7/2015 | Nuckley et al. |

(Continued)

FOREIGN PATENT DOCUMENTS

| | | |
|---|---|---|
| EP | 3315085 A1 | 5/2018 |
| WO | 2009/129026 A1 | 10/2009 |

*Primary Examiner* — David W Bates
(74) *Attorney, Agent, or Firm* — BakerHostetler (57) ABSTRACT

An array stabilizer for a surgical system includes a pair of arms configured to extend alongside opposite sides of a portion of an array adapter, which is attachable to a rotational instrument in a manner such that the rotational instrument is rotatable about a central axis relative to the array adapter. The array adapter is configured to extend from another component of the surgical system, such that at least one of the arms of the array adapter is configured to resist rotation of the array adapter about the central axis relative to such component as the rotational instrument rotates. The array stabilizer is either rigidly integrated with such component or is coupled to such component via a coupling device.

18 Claims, 6 Drawing Sheets

(56) References Cited

U.S. PATENT DOCUMENTS

| | | | |
|---|---|---|---|
| 9,451,999 B2* | 9/2016 | Simpson | A61B 17/162 |
| 9,468,427 B2 | 10/2016 | DiCorleto et al. | |
| 10,285,715 B2* | 5/2019 | Peters | A61B 17/1655 |
| 10,368,878 B2* | 8/2019 | Lavallee | A61B 34/70 |
| 10,667,923 B2* | 6/2020 | Sullivan | A61B 17/864 |
| 10,722,223 B2* | 7/2020 | Wehrli | A61B 34/20 |
| 10,779,894 B2 | 9/2020 | Dees, Jr. et al. | |
| 10,932,840 B2 | 3/2021 | DiCorleto | |
| 11,819,287 B2* | 11/2023 | Lequette | A61B 34/25 |
| 11,864,806 B2* | 1/2024 | Biedermann | A61B 17/8875 |
| 2004/0054489 A1* | 3/2004 | Moctezuma De La Barrera | G16Z 99/00 702/105 |
| 2004/0152955 A1* | 8/2004 | McGinley | A61B 17/1703 600/300 |
| 2004/0171930 A1* | 9/2004 | Grimm | A61B 90/39 606/80 |
| 2008/0045972 A1* | 2/2008 | Wagner | A61B 90/39 606/130 |
| 2009/0264940 A1* | 10/2009 | Beale | A61B 90/39 606/86 R |
| 2011/0263971 A1* | 10/2011 | Nikou | A61B 90/39 600/424 |
| 2012/0123418 A1 | 5/2012 | Giurgi et al. | |
| 2013/0060278 A1* | 3/2013 | Bozung | A61B 17/1615 606/205 |
| 2013/0261609 A1* | 10/2013 | Dicorleto | A61B 17/00234 606/1 |
| 2015/0105833 A1* | 4/2015 | Simpson | A61B 17/8875 606/86 R |
| 2018/0116814 A1 | 5/2018 | Sullivan et al. | |
| 2019/0231408 A1* | 8/2019 | DiCorleto | A61B 34/20 |
| 2020/0178985 A1* | 6/2020 | Xu | A61B 17/17 |
| 2021/0244478 A1* | 8/2021 | Richter | A61B 34/30 |

* cited by examiner

SURGICAL ARRAY STABILIZERS, AND RELATED SYSTEMS AND METHODS

CROSS REFERENCE TO RELATED APPLICATIONS

This application claims benefit under 35 U.S.C. § 119(e) of Provisional U.S. Patent Application No. 63/233,350, filed Aug. 16, 2021, the entire contents of which are hereby incorporated by reference herein.

TECHNICAL FIELD

The present invention relates to surgical instruments and systems, and more particularly to stabilizers for maintaining a desired relative position between one component of the surgical system and at least one other, driven component of the surgical system during surgery.

BACKGROUND

Computer assisted image-guided surgical navigation systems are known and used to generate images in order to assist a surgeon during a surgical procedure. In general, these image-guided systems use images of a patient anatomy, such as CT scans of the anatomy, taken before surgery to generate images on a display, such as a monitor screen. These images are used during surgery for illustrating the position of a surgical instrument with respect to the anatomy. The systems typically include tracking devices such as a tracking array mounted on a surgical instrument, a digitizer to track in real time relative positions of the tracking array (and the instrument attached thereto) and patient anatomy during surgery, and a monitor screen to display images representing the instrument and its position relative to the patient anatomy during the surgery.

SUMMARY

According to an embodiment of the present disclosure, a surgical system includes a rotational instrument that extends along a central axis oriented along a longitudinal direction and also includes an array adapter that is configured to carry a reference array and is also attachable to the rotational instrument in a manner such that the rotational instrument is rotatable about the central axis relative to the array adapter. The surgical system includes a guide member that defines a cannulation configured to receive a portion of the rotational instrument. The guide member includes a pair of integrated stabilizer arms that extend proximally therefrom and alongside opposite sides of a portion of the array adapter. At least one of the stabilizer arms is configured to resist rotation of the array adapter relative to the guide member about the central axis.

According to another embodiment of the present disclosure, a surgical system includes a rotational instrument and an array adapter attachable to the rotational instrument. The rotational instrument extends along a central axis and has a proximal end that is configured to be rotationally driven about the central axis by a powered tool. The array adapter is configured to carry a reference array and is attachable to the rotational instrument in a manner such that the rotational instrument is rotatable about the central axis relative to the array adapter. The system includes a guide member that defines a cannulation configured to receive a portion of the rotational instrument and also includes a stabilizer that is attachable to at least one of a portion of the tool and a portion of the guide member. The stabilizer has a pair of arms configured to extend alongside opposite sides of a portion of the array adapter. At least one of the pair of arms is configured to resist rotation of the array adapter about the central axis relative to the guide member or the tool to which the stabilizer is attached.

According to an additional embodiment of the present disclosure, an array stabilizer for a surgical system includes a pair of arms configured to extend alongside opposite sides of a portion of an array adapter, which is attachable to a rotational instrument in a manner such that the rotational instrument is rotatable about a central axis relative to the array adapter. The array adapter is configured to extend from another component of the surgical system, such that at least one of the arms of the array adapter is configured to resist rotation of the array adapter about the central axis relative to at least one other component of a surgical system when the array stabilizer is attached to the at least one other component. The array stabilizer includes a coupling device for attaching the array stabilizer to the at least one other component.

BRIEF DESCRIPTION OF THE DRAWINGS

The foregoing summary, as well as the following detailed description of illustrative embodiments of the present application, will be better understood when read in conjunction with the appended drawings. For the purposes of illustrating the features of the present application, there is shown in the drawings illustrative embodiments. It should be understood, however, that the application is not limited to the precise arrangements and instrumentalities shown. In the drawings.

DETAILED DESCRIPTION OF ILLUSTRATIVE EMBODIMENTS

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The terms "approximately", "about", and "substantially", as used herein with respect to dimensions, angles, ratios, and other geometries, takes into account manufacturing tolerances. Further, the terms "approximately", "about", and "substantially" can include 10% greater than or less than the stated dimension, ratio, or angle. Further, the terms "approximately", "about", and "substantially" can equally apply to the specific value stated.

It should be understood that, although the terms first, second, etc. may be used herein to describe various elements, these elements should not be limited by these terms. These terms are instead used to distinguish one element from another. For example, a first element could be termed a second element, and, similarly, a second element could be termed a first element, without departing from the scope of the embodiments disclosed herein.

The embodiments disclosed herein pertain to surgical systems that include stabilizers for maintaining a relative rotational position of a visual array of a rotational instrument (e.g., drill bits, taps, awls, reamers, screw drivers, and the like) with respect to a medical imaging device, such as a CT-scanner or fluoroscope. The stabilizers disclosed herein include a pair of arms that extend along opposite sides of an array connector (such as a post that connects the array to the rotational instrument) and thereby stabilize the array 24 from unwanted rotational movement about a central axis of the rotational instrument, which allows a physician to operate the rotational instrument, the array, and associated guide members using only two hands instead of three hands. In some of the embodiments disclosed herein, the stabilizer can be integrated with and monolithic with a guide member through which the rotational instrument extends. In other embodiments disclosure herein, the stabilizer can be separate from and rigidly attachable with another component of the surgical system.

Although the exemplary embodiments disclosed below are described with reference to a surgical drill system that includes a drill bit for drilling a hole in a target region of bone, it should be appreciated that the embodiments herein can also be adapted for use with other types of rotational instruments, such as taps, awls, awl taps, reamers, and screw drivers, by way of non-limiting examples.

Figure 1A:
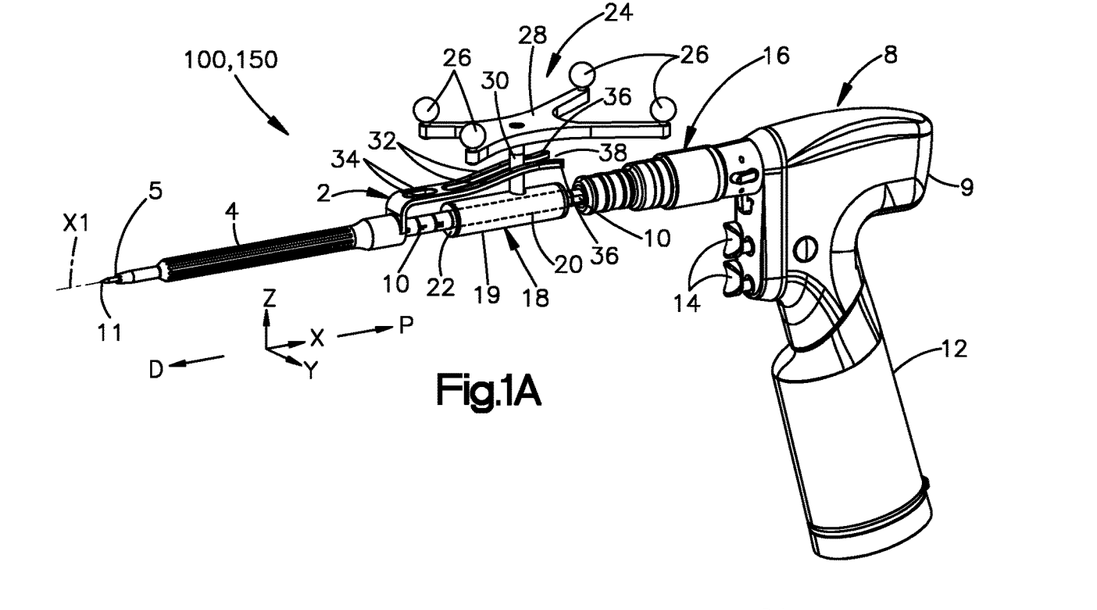
FIG. 1A is a perspective view of a surgical drill system having a stabilized drill assembly that includes a drill bit that extends within a drill guide sleeve and carries a reference array, such that integrated stabilizer arms extend from the drill sleeve and positionally stabilize the array, according to an embodiment of the present disclosure.
Figure 1B:
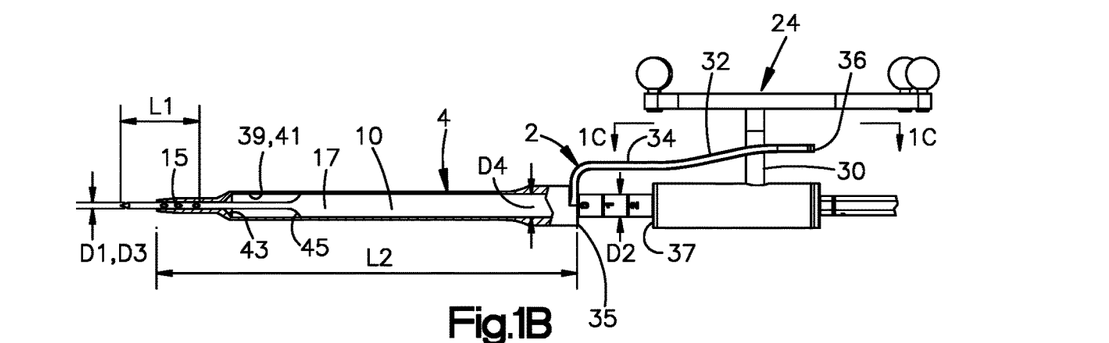
FIG. 1B is a side, partial sectional view of the drill bit, guide sleeve, array, and stabilizer arms of the surgical drill system illustrated in FIG. 1A.
Figure 1C:
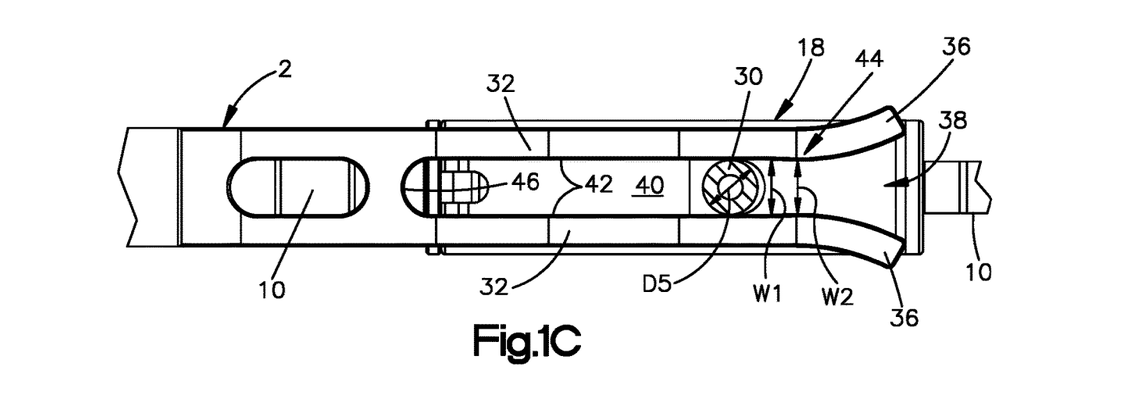
FIG. 1C is a top sectional view of a region of the drill assembly taken along section line 1C-1C illustrated in FIG. 1B.

Referring to FIGS. 1A-1C, a surgical system 100 is shown that employs an example embodiment of stabilized rotational instrument assembly 150. In this example, the surgical system 100 is a drill system 100 that employs a stabilized drill assembly 150, although in other embodiments other rotational instruments can be employs, such as taps, awls, awl taps, reamers, screw drivers, and the like. The stabilized drill assembly 150 includes an array stabilizer 2 (also referred to herein simply as a "stabilizer" 2), which, in this example, extends in a proximal direction P from a drill guide member, such as a drill sleeve 4. Thus, the drill sleeve 4 extends from the stabilizer 2 in a distal direction D opposite the proximal direction. It should be appreciated that, as referred to herein, the proximal and distal directions P, D are each mono-directional components of a longitudinal direction X, which is bi-directional. The stabilizer 2 is preferably rigidly affixed to the drill sleeve 4. In this example, the stabilizer 2 and the drill sleeve 4 are monolithic with each other. In other embodiments, however, the stabilizer 2 and the drill sleeve 4 can be separate components that are rigidly coupled to each other, such as by being welded together or rigidly coupled with a fastener, by way of non-limiting examples. The drill system 100 includes a tool 8, preferably a powered tool, for advancing a drill member 10, such as a drill bit, through the drill sleeve 4 and out a distal end 5 thereof and into a target region of patient anatomy, such as bone. The target region can include a pedicle of a vertebral body, by way of a non-limiting example. In FIG. 1A, the drill bit 10 is shown such that a distal end 11 of the drill bit 10 is positioned distal of the distal end 5 of the drill sleeve 4, which can coincide with an intermediate position or "depth" of the drill bit 10 relative to the drill sleeve 4. The tool 8 includes an outer housing 9 and also includes a drill coupler, such as a chuck, for coupling with and driving rotation of the drill bit 10 about a central axis X1 of the drill bit 10. The central axis X1 is oriented along the longitudinal direction X. The tool 8 can include a handle portion 12 and one or more control members, such as control buttons 14, for controlling operation of the tool 8, such as the rotational speed and rotational direction of the drill bit 10 about the central axis X1.

The tool 8 also preferably includes one or more adapters, such as a power adapter 16 adjacent the chuck and an array adapter 18, which will be discussed in more detail below. In the present example, the power adapter 16 surrounds and provides a cowling for the chuck and is rotationally fixed with respect to the outer housing 9. In this manner, the power adapter 16 is configured to remain rotationally stationary relative to the housing 9 while the chuck and the drill bit 10 rotate about the central axis X1. The array adapter 18 is also configured to couple with the drill bit 10 in a manner allowing the drill bit 10 to rotate about the central axis X1 relative to the array adapter 18 while the array adapter 18 remains substantially rotationally stationary with the tool 8. The array adapter 18 can include a body member 19 that defines a central bore 20 through which the drill bit 10 extends. The body member 19 can be elongate along the longitudinal direction X and preferably includes at least one mounting formation configured to couple with a complimentary mounting structure of the drill bit 10, such as a mounting flange structure 22 of the drill bit 10. The complimentary mounting formation and mounting structure are preferably cooperatively configured to provide the array adapter 18 with a thrust bearing and a journal bearing for the drill bit 10, such that, when coupled, a relative longitudinal position between the array adapter 18 and the drill bit 10 is maintained (i.e., thrust bearing functionality) while the drill bit 10 is rotatable relative to the array adapter 18 (i.e., journal bearing functionality).

The system 100 includes a reference structure 24, also referred to herein as a "reference array" 24 or simply an "array" 24, that is configured to be visible under medical imaging, such as x-ray, fluoroscopy, CT images, and the like, for providing a surgeon with visible reference points of surgical instrumentation relative to patient anatomy. The array 24 includes one or more reference markers 26 (also referred to herein as "array markers" 26 or simply "markers" 26), which can be ball reflectors or other structures for clear visibility in the medical imagery (e.g., fluoroscopy and/or CT scans). The markers 26 are preferably arranged in a pattern configured to provide visual indicia of an orientation of the drill bit 10 and/or the tool 8 relative to patient anatomy. In this manner, the array 24 assists the surgeon for accurate insertion of the drill bit 10 into the target location of bone. In some embodiments, the reference markers 26 can be co-planar with each other. Additionally or alternatively, the reference markers 26 can be arranged in a pattern that provides visual indicia of an orientation of the central axis X1. The reference markers 26 can be coupled to an array body 28 that carries the markers 26 in the desired pattern. The array adapter 18 can include a coupling member, such as a post 30, that connects the array 24 to the adapter body 19.

The stabilizer 2 is configured to stabilize the array 24, particularly by providing structural support to the array 24 so as to resist unwanted movement of the array 24 during use. For example, in some instances, an unsupported array adapter 18, and thus the array 24 thereof, might slip rotationally about the central axis X1 during use, such as under influence of gravity, such as while the drill bit 10 is rotationally driven about axis X1. For example, the weight of the array 24 tends to influence rotation of the array adapter 18 about the drill bit 10 until the array 24 is positioned at a vertical nadir relative to the central axis X1. During typical use, the journal bearing structure of the array adapter 18 can maintain the rotational position of the array adapter 18 (and the array 24) relative to the tool 8 while the drill bit 10 rotates. However, destabilizing forces, such as vibrations imparted from the drill bit 10 to the array adapter 18, have been known in some instances to destabilize the rotational position of the array adapter 18 relative to the tool 8 enough to cause the array adapter 18 to slip rotationally about the central axis X1 toward a bottomed-out position. The stabilizer 2 is configured to provide stabilizing support to the array adapter 18 to prevent such unwanted rotation and thereby maintain the fixed rotational position of the array adapter 18 (and thus the array 24) with the tool 8.

As shown, the stabilizer includes at least one support member that is configured to contact the array adapter 18 in a manner resisting rotational movement of the array adapter 18 relative to the drill sleeve 4. As shown, the at least one support member can be a pair of arms 32 that extend on opposite sides of the post 30 and contact the post 30 so as to maintain a rotational position of the post 30 (and thus the array adapter 18 and array 24) relative to the drill sleeve 4 about the central axis X1. The arms 32 extend generally longitudinally from attached ends 34 adjacent the drill sleeve 4 to free ends 36 that are remote from the drill sleeve 4. The arms 32 are spaced from each other along a lateral direction Y that is substantially perpendicular to the longitudinal direction X. The arms 32 define a lateral opening 38 therebetween at the free ends 36 thereof, such that the post 30 of the array adapter 18 can be received between the arm 32 through the opening 38. It should be appreciated that, as used herein: the terms "longitudinal", "longitudinally", and derivatives thereof refer to the longitudinal direction X; the terms "lateral", "laterally", and derivatives thereof refer to the lateral direction Y; and the terms "vertical", "vertically", and derivatives thereof refer to a vertical direction Z that is substantially perpendicular to the longitudinal and lateral directions X, Y.

Referring now to FIG. 1B, the stabilizer arms 32, or at least portions thereof, can extend longitudinally and also vertically from their attached ends 34 to their free ends 36. The drill sleeve 4 is configured such that, during use in a surgical procedure, a surgeon can advance the drill sleeve 4, such as manually, through patient anatomy, such as through an incision through soft tissue (e.g., skin and muscle), until the distal end 5 of the sleeve 4 purchases or "docks" with an exterior surface of the bone at the target region thereof. Such purchase or docking can be observed and configured via medial imagery, such as CT-scans and/or fluoroscopy. The distal end 5 of the sleeve 4 preferably defines teeth or other engagement structures for purchasing (e.g., "biting" into) the exterior surface of the bone. The tool 8 is configured to advance the drill bit 10 through a cannulation 41 of the drill sleeve 4 until a distal end of the bit 10 contacts the target region of bone, which contact can be observed and confirmed under the medical imagery. The tool 8 can be powered to rotationally and translationally drive a distal, drill region 15 of the bit 10 into the target region of the bone. The drill region 15 of the bit 10 can include fluting for engaging and cutting through bone material as the bit 10 advances into the target region of the bone. The drill region 15 of the bit 10 can have a length L1 measured along the longitudinal direction X. The drill bit 10 also defines a drill diameter D1 along the drill region 15 and a shaft diameter D2 along a shaft region 17 of the drill bit 10 located proximally of the drill region 15. It should be appreciated that the length L1 and drill diameter D1 can be adapted as needed to provide different insertion depths and hole diameters within bone.

The drill sleeve 4 and/or the stabilizer 2 can define one or more depth-limiting features for controlling a maximum insertion depth of the drill bit 10 within the target region of bone. One example of such a depth-limiting feature can include a proximal surface 35 of the drill sleeve 4, which can be configured to abut a distal-facing surface 37 of a formation of the drill bit 10 and/or of the array stabilizer 18. As shown, the distal-facing surface 37 can be defined by the mounting flange structure 22 of the drill bit 10. The distal-facing surface 37 can be configured to abut the proximal surface 35 of the drill sleeve 4 when the drill bit 10 has been inserted at a maximum depth into the target bone. In this example of a depth-limiting feature, a length L2 of the drill sleeve 4, as measured from the proximal surface 35 to the distal end 5 along the longitudinal direction X, can effectively determine the maximum insertion depth of the drill bit 10 into bone.

It should be appreciated that the drill system 100 can include a kit having a plurality of drill sleeves 4 configured as described above, in which the drill sleeves 4 include respective stabilizers 2 extending therefrom, and in which various ones of the drill sleeves 4 and/or drill bits 10 have different parameters for providing a surgeon with various treatment options for the patient. Such differing parameters can include lengths L1 and L2, which can correspond to various desired insertion depths of the drill bit 10, and drill diameters D1, which correspond to various hole diameters to be drilled within the bone. Additionally or alternatively, the kit can include a plurality of drill bits 10 having different overall lengths, and each drill bit 10 can optionally be configured for exclusive use with a corresponding one of the plurality of drill sleeves of different lengths L1. It should be appreciated that such kits that provide the foregoing components of various parameters can allow the surgeon to select respective ones of the components for use based on the desired treatment parameters provided, such as insertion depth and hole diameter, by way of non-limiting examples.

Another example of a depth-limiting feature can include complimentary abutment surfaces of the drill sleeve 4 and drill bit 10 on an interior of the drill sleeve 4. For example, the drill sleeve 4 defines an interior surface 39 that defines a cannulation 41 through which the drill bit 10 extends. A distal portion of the interior surface 39 preferably defines a distal inner sleeve diameter D3 that corresponds to the drill diameter D1 of the distal region 15 of the drill bit 10. A proximal portion of the interior surface preferably defines a proximal inner sleeve diameter D4 that corresponds to the shaft diameter D2 of the shaft region 17 of the drill bit 10. A shoulder portion 43 of the interior surface 39 between the distal and proximal portions thereof can face toward the proximal direction P so as to provide an abutment surface within the cannulation 41. The drill bit 10 can define a complimentary abutment surface 45 that faces toward the distal direction D and is configured to contact the shoulder surface 43 in distal arresting fashion when the drill bit 10 advanced to a maximum depth into the target bone. It should be appreciated that other types and configurations of depth-limiting features are within the scope of the present disclosure.

In some embodiments, the kit can include one or more size-matching features for ensuring that drill bits 10 of different sizes can only be used with correspondingly sized drill sleeves 4. For example, in one such embodiment, the kit can include a plurality of drill bits 10 having three (3) different drill diameters D1, which can be characterized as small, medium, and large drill diameters D1. The kit includes a plurality of drill sleeves 4 having three (3) corresponding distal inner sleeve diameters D3, which can be characterized as small, medium, and large distal inner sleeve diameters D3. Additionally, the plurality of drill bits 10 have three (3) different shaft diameters D2 (small, medium, and large) and the plurality of drill sleeves 4 have three (3) different corresponding proximal inner sleeve diameters D4 (small, medium, and large). In this example embodiment, corresponding diameters D1, D2, D3, D4 are sized such that: the "small" drill bit 10 is fully insertable within the "small" drill sleeve 4; the "medium" drill bit 10 is fully insertable within the "medium" drill sleeve 4; and the "large" drill bit 10 is fully insertable within the "large" drill sleeve 4, each as shown in FIG. 1B. However, the shaft diameter D2 of the "small" drill bit 10 is greater than the proximal inner sleeve diameter D4 of the "medium" and "large" drill sleeves 4. Thus, if a user attempted to insert the "small" drill bit 10 into the "medium" or "large" drill sleeves 4, the shaft region 17 of the drill bit 10 would not be able to enter the proximal portion of the cannulation 41 of the drill sleeve 4 because, in such pairings, the proximal inner sleeve diameters D4 is less than the shaft diameter D2. Additionally, the bit diameter D1 of the "large" drill bit 10 is greater than the distal inner sleeve diameters D3 of the "small" and "medium" drill sleeves 4. Thus, if a user attempted to insert the "large" drill bit 10 into the "small" or "medium" drill sleeves 4, the distal region 15 of the drill bit 10 would not be able to enter the distal portion of the cannulation 41 because, in such pairings, the distal inner sleeve diameter D3 is less than the bit diameter D1. Moreover, if a user attempted to insert the "medium" drill bit 10 into the "small" drill sleeve 4, the distal region 15 of the drill bit 10 would not be able to enter the distal portion of the cannulation 41 because D1 is greater than D3 in such pairing; and if a user attempted to insert the "medium" drill bit 10 into the "large" drill sleeve 4, the proximal region 17 of the drill bit 10 would not be able to enter the proximal portion of the cannulation 41 because D2 is greater than D4 in such pairing. It should be appreciated that the foregoing size-matching features represent non-limiting examples of such features of the drill bits 10 and drill sleeves 4.

As shown in FIG. 1C, the arms 32 can define a channel or slot 40 between one another along the lateral direction Y. The free ends 36 of the arms 32 can flare outwardly so as to provide a funnel-like structure at the opening 38 for guided reception of the post 30 of the array stabilizer 18. The arms 32 define a lateral slot width W1 between opposed inner surfaces 42 of the arms 32. The slot width W1 can be substantially constant along at least a longitudinal main portion of the slot 40 and is preferably substantially equivalent to a lateral width (e.g., diameter) D5 of the post 30. The arms 32 can also define a retention feature for retaining the post 30 within the slot 40, or for at least resisting back-out of the post 30 through the opening 38. For example, opposed portions of the arms 32 proximate the free ends 36 thereof can define a narrowed portion 44 of the slot 40, such that the narrowed portion 44 has a slot width W2 that is less than slot width W1 and preferably marginally less than the lateral width D5 of the post 30. The arms 32 can be configured to flex outwardly as the post 30 passes through the narrowed portion 44 of the slot 40, and thereafter to return to a neutral position in a manner providing resistance to the post 30 backing-out from the slot 40. Moreover, the arms 32 can be configured to provide an audible sound, such as a click-like sound, when the arms 32 flex inward to a neutral position after the post 30 passes through the narrowed portion 44 of the slot 40, thereby indicating when the post 30 is seated within the main portion of the slot 40. It should be appreciated that the drill bit 10 and the array adapter 18 are configured to advance longitudinally with respect to the stabilizer 2 and the drill sleeve 4. The slot 40 can be configured to facilitate longitudinal translation of the array adapter 18 relative to the stabilizer 2. For example, the inner surfaces 42 of the arms 32 can extend substantially parallel with each other and at a constant slot width W1 along the main portion thereof so that the post 30 can translate along the inner surfaces 42 within the slot 40. The stabilizer 2 can also define an end surface 46 of the slot 40 opposite the opening 38. The end surface 46 can optionally be configured to arrest or otherwise impede distal movement of the array adapter 18 relative to the stabilizer 2, thereby providing an additional and/or alternative depth-limiting feature for the drill bit 10.

As shown, the constant slot width W1 along the main portion of the slot 40 can be substantially equivalent to the width D5 of the post 30, so that the arms 32 provide a snug fit with the post 30 and "hold" the post 30 between the arms 32, thereby preventing the post 30 (and thereby also the array adapter 18 and the array 24) from rotating about the central axis X1 relative to the drill sleeve 4. In some embodiments, the slot width W1 can be slightly less than the width D5 of the post, thereby providing a snug interference fit. In these manners, when the post 30 is received in the main portion of the slot 40, manipulation of the drill sleeve 4 position and/or orientation, such as rotationally about the central axis X1 and/or via angulation about one or more pivot axes perpendicular to the central axis X1, can concurrently also manipulate the array adapter 18 (and thus also the array 24) rotationally about the central axis X1 and/or via angulation about such one or more pivot axes in corresponding fashion. Stated differently, the snug fit of the post 30 between the arms 32 can allow a physician to control an orientation of the array adapter 18 (and thus the array 24 and the drill bit 10) by manipulating the drill sleeve 4. The snug fit between the post 30 and the arms 32 can also eliminate or at least reduce vibration or rattle of the array adapter 18 (and thus also the array 24 and the drill bit 10) relative to the drill sleeve 4, relative to the tool 8, and/or relative to patient anatomy. It should be appreciated that the arms 32 preferably also have a measure of flexibility, which can allow the arms 32 to flex outwardly slightly to receive the post 30 in an interference fit. In some embodiments, the arms 32 can have a measure of flexibility to allow the arms 32 to act as vibration dampeners during use.

Figure 1D:
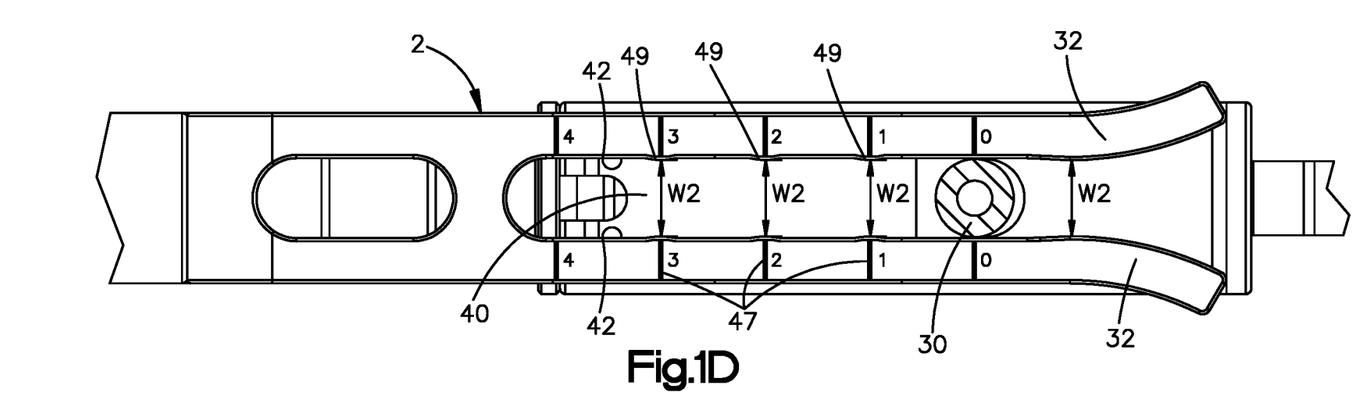
FIG. 1D is another top sectional view of the region illustrated in FIG. 1C, further showing indicia for indicating an insertion depth of the drill bit, according to an embodiment of the present disclosure.

Referring now to FIG. 1D, the stabilizer 2 can be adapted to provide indicia for a status of the surgical system 100, such as relative longitudinal positions between the drill bit 10 and the drill sleeve 4, such as the insertion depth of the drill bit 10. For example, one or both of the arms 32 can have visual indicia, such as a series of markings 47 at length increments thereon, that can be referenced with the post 30 to indicate the insertion depth of the drill bit 10. The length increments can correspond to 10 mm insertion depth increments, by way of a non-limiting example. Additionally or alternatively, the stabilizer 2 can also provide tactile feedback indicating the insertion depth of the drill bit 10. For example, the inner surfaces 42 of the arms 32 can have respective series of opposed bumps 49 at length increments thereon. The opposed bumps 49 can define respective slot widths W2 therebetween, which can be less than the main slot width W1 and less than the post width D5, so that the post 30 engages the bumps 49 in a manner providing tactile feedback of the insertion depth as the drill bit 10 advances through the drill sleeve 4.

Figure 1E:
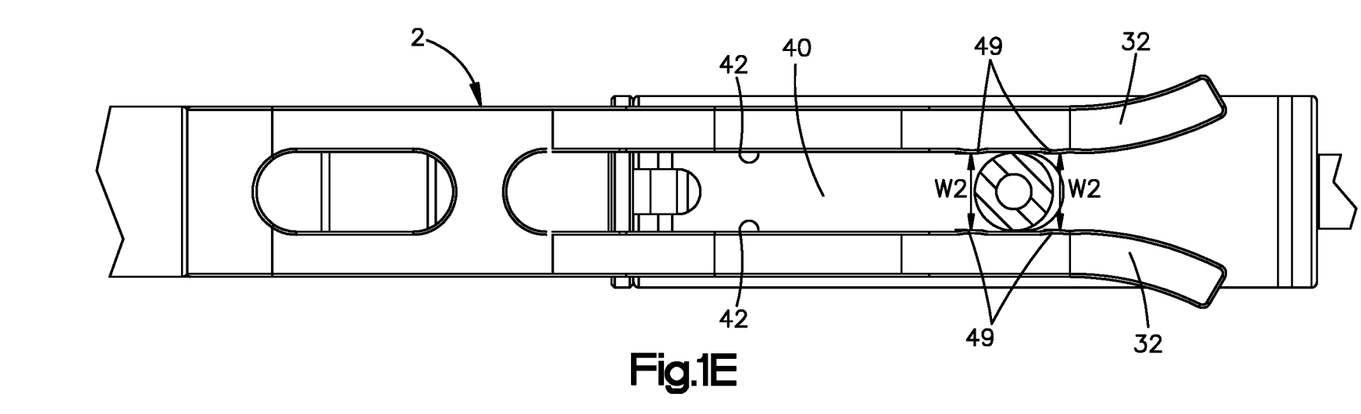
FIG. 1E is another top sectional view of the region illustrated in FIG. 1C, showing retention features for temporarily holding the drill bit at a reference location with respect to the guide sleeve, according to an embodiment of the present disclosure.

Referring now to FIG. 1E, the stabilizer 2 can additionally or alternatively be configured to provide a holding force on the drill bit 10 at a reference position, such as a starting position (e.g., zero insertion depth) relative to the drill sleeve 4. For example, the inner surfaces 42 of the arms 32 can define two pairs of opposed bumps 43 such that each pair defines a reduced slot width W2. The pairs of bumps 43 can be configured to hold the post 30 therebetween at the reference position (e.g., zero insertion depth) until a sufficient distal force is applied to advance the drill bit 10 from the reference position. The retention force can be configured, for example, to allow one-handed docking of the drill assembly 150 against the target region of bone during surgery.

Figure 2A:
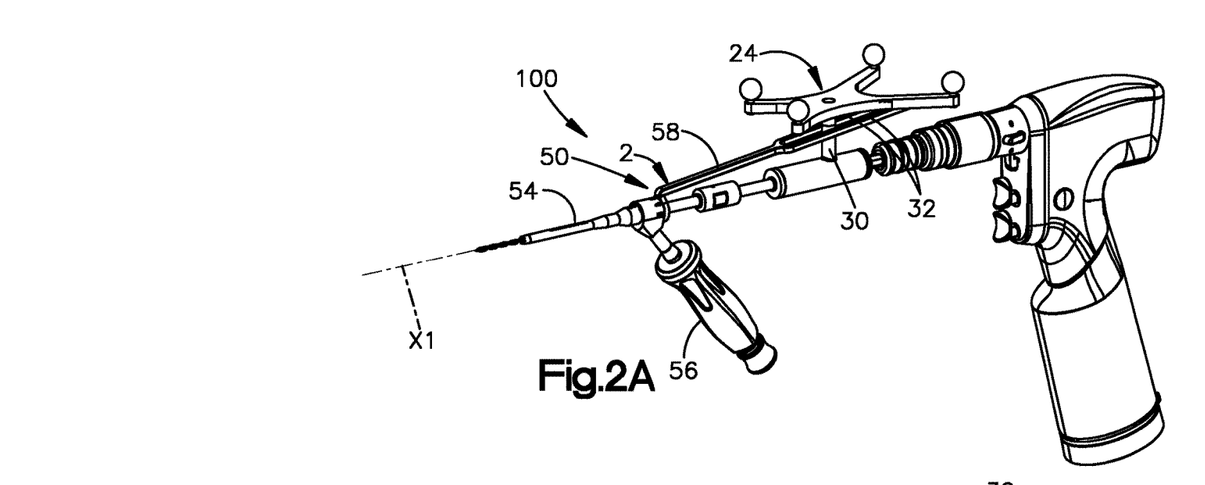
FIG. 2A is a perspective view of a surgical drill system having a stabilized drill assembly, according to another embodiment of the present disclosure.
Figure 2B:
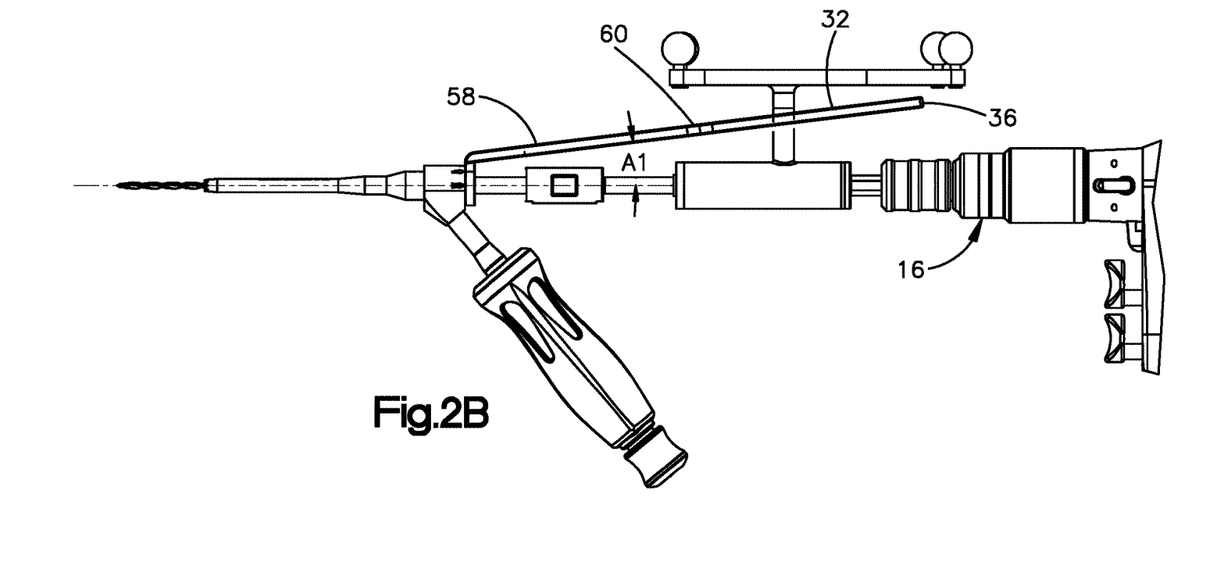
FIG. 2B is a side view of the stabilized drill assembly illustrated in FIG. 2A.

Referring now to FIG. 2A, another example of a stabilizer 2 is shown, in which the stabilizer is rigidly coupled with a drill guide member 50 that includes a sleeve member 54 and handle 56, which can extend outwardly from the sleeve member 54, such as at an oblique angle relative to the central axis X1, such as in a pistol-grip fashion. The sleeve member 54 of the present embodiment can be configured similar to the guide sleeve 4 described above. The handle 56 of the present embodiment can provide the surgeon with a beneficial mode for manipulating the orientation and/or angulation of the sleeve member 54. The stabilizer 2 of the present embodiment can be welded to the sleeve member 54 or rigidly affixed via a fastener. As shown, the stabilizer can include an extension member 58 that extends proximally from the sleeve member 54, and can also include a junction 60 between the extension member 58 and the attachment ends 34 of the arms 32. At the junction 60, the arms 32 can branch away from each other so that major portions of the arms 32 extend parallel to each other so as to define the slot 40 between the arms 32. The major portions of the arms 32 can extend substantially linearly to the free ends 36 thereof. As shown in FIG. 2B, the extension member 58 and the major portions of the arms 32 can extend at a substantially constant sloped angle A1 with respect to the central axis X1, such that a vertical height of the arms 32 increases moving proximally from the junction 60 to the free ends 36 of the arms 32. The sloped angle A1 can be selected such that the arms 32 bypass and do not interfere with the power adapter 16. Alternatively, the sloped angle A1 can vary along the length of the arms 32. For example, one or more portions of the arms 32 can extend at a sloped angle A1, which can be constant or can vary, while one or more other portions of the arms 32 can extend along the longitudinal direction X. It should be appreciated that additional and/or alternative arm 32 geometries can be employed.

Figure 2C:
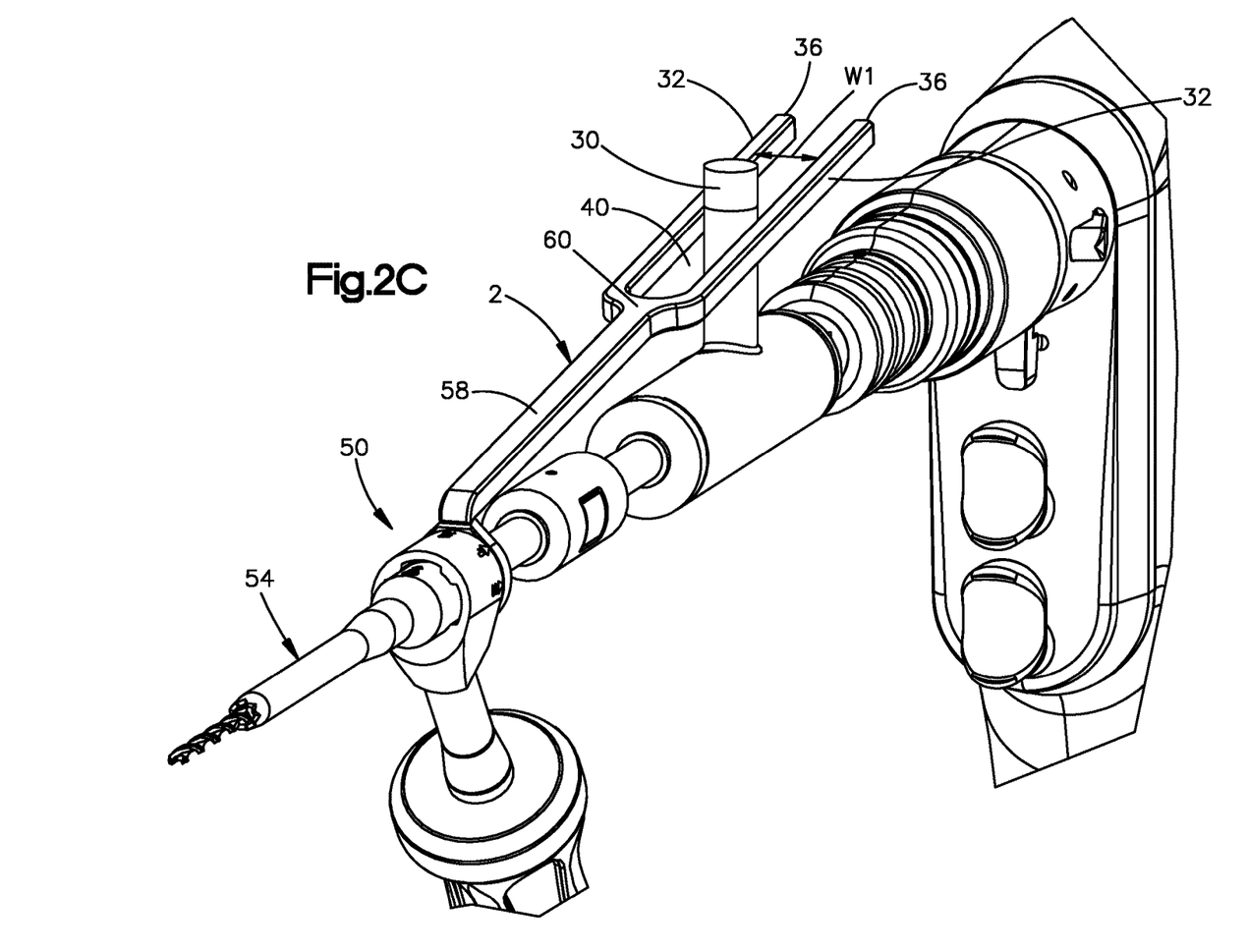
FIG. 2C is a perspective view of the stabilized drill assembly illustrated in FIG. 2B, wherein an array of the assembly has been sectioned off for visualization purposes.

Referring now to FIG. 2C, the arms 32 of the present embodiment can extend linearly and parallel to each other to each other, including at the free ends 36 thereof. In this manner, the slot width W1 can be constant along the major portions of the arms 32 to the free ends 36 thereof. Alternatively, the free ends 36 can flare outwardly in a funnel-like fashion, similar to the manner described above. Additionally or alternatively, the arms 32 of the present embodiment can define a narrowed portion, such as for providing a retention structure for retaining the post 30 within the slot, similar to the manner described above.

Figures 3A, 3B, 3C:
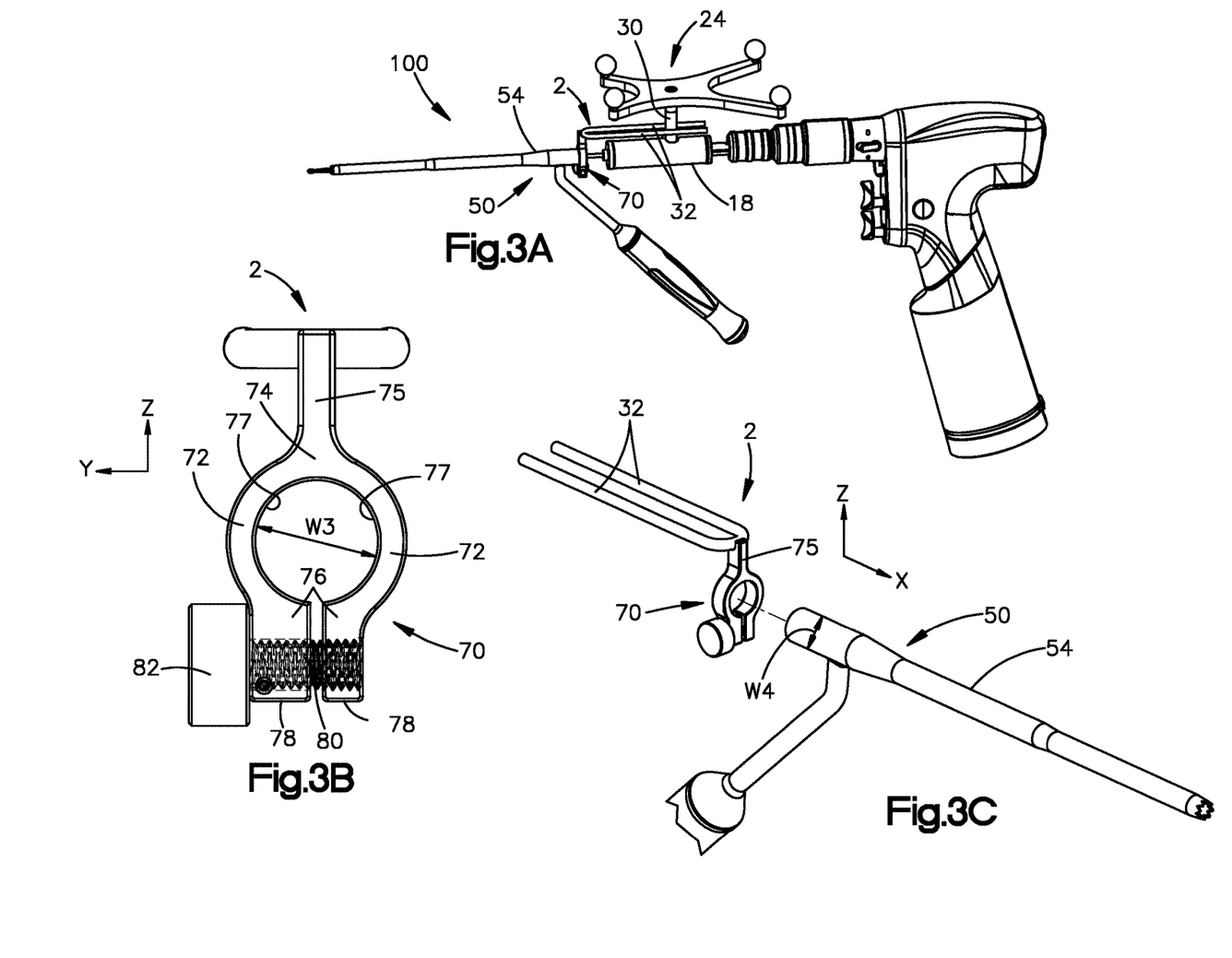
FIG. 3A is a perspective view of a surgical drill system having a stabilized drill assembly that includes an attachable stabilizer for the array, according to an additional embodiment of the present disclosure.
FIG. 3B is a front view of the attachable stabilizer illustrated in FIG. 3A.
FIG. 3C is a partial exploded view the attachable stabilizer and a drill guide of the drill assembly illustrated in FIG. 3A.

Referring now to FIGS. 3A-3C, in additional embodiments, the stabilizer 2 can be a separate component that is attachable to another contact point of the drill system 100, such as on the sleeve member 54 of a drill guide 50. The stabilizer 2 of such embodiments can include a coupling device 70 for rigidly coupling the stabilizer 2 to the sleeve member 54 of the drill guide 50. As shown, the coupling device 70 can be a collar clamp having a pair of opposed, flexible collar members 72, which can extend from a joined end 74 to respective second ends 76 that are spaced from the joined end 74 along a direction, such as the vertical direction Z. The collar members 72 can define opposed clasps, which can have semi-circular shapes for clasping around the outer surface of the sleeve member 54. The second ends 76 of the collar members 72 can define respective coupling tabs 78, which can carry a tightening member, such as a thumb screw 80 that extends through respective threaded receptacles of the coupling tabs 78. The thumb screw 80 can have a head 82, which can be rotated to actuate the thumb screw 80 to press the coupling tabs 78 toward each other. In this manner, the thumb screw 80 can be rotated to cause the collar members 72 to clamp against the outer surface of the sleeve member 54, thereby rigidly affixing the stabilizer 2 to the drill guide 50. The collar clamp coupling device 70 of the present embodiment can advantageously allow the surgeon to affix the stabilizer 2 (and thus also the array adapter 18 and the array 24) at any angular position about the circumference of the sleeve member 54, which angular position can be selected based on the particular parameters of the surgical treatment zone, such as the target trajectory axis X1 and/or the position and orientation of the medical imager, by way of non-limiting examples. The collar members 72 are preferably sized so that inner surfaces 77 thereof generally conform to the outer surface of the sleeve member 54 at the coupling location thereof. For example, a width W3 between the inner surfaces 77 of the collar members 72 can be substantially equivalent to a width W4 (such as an outer diameter) of the outer surface of the sleeve member 54 of the power adapter 16 at the coupling location, at least when the tightening member 80 is tightened.

It should be appreciated that the coupling device 70 described herein is provided as one non-limiting example of an attachment device for attaching the stabilizer 2 to another component of the drill system 100. Various other coupling devices, fasteners, and joining techniques and methods are within the scope of the present disclosure.

In the present embodiment, the stabilizer arms 32, or at least the major portions thereof, can extend substantially strictly along the longitudinal direction X. In such embodiments (or other embodiments), the stabilizer 2 can include a riser member 75 that extends vertically from the joined end 74 of the collar members 72 to the attachment ends 34 of the arms 32. The riser member 75 can be configured to position the arms 32 so that they do not mechanically interfere with the tool 8, such as the power adapter 16 thereof, when the stabilizer 2 is rigidly coupled with the guide member 50.

Figures 4A, 4B, 5:
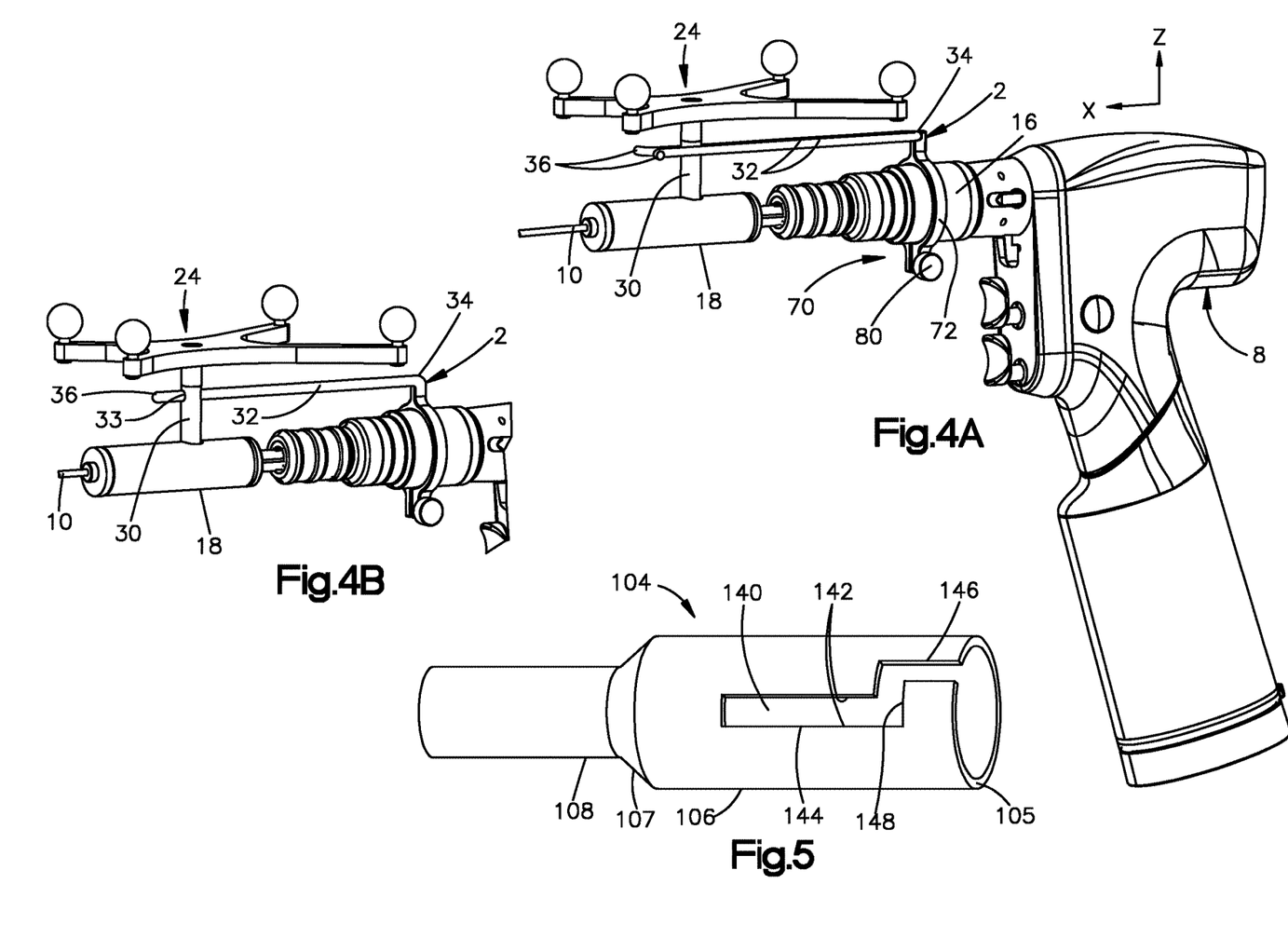
FIGS. 4A and 4B are perspective views of surgical drill systems having alternative stabilized drill assemblies that each include an attachable stabilizer for the array, according to yet additional embodiments of the present disclosure.
FIG. 5 is a perspective view of a monolithic stabilized drill guide, according to another embodiment of the present disclosure.

Referring now to FIG. 4A, in further embodiments, the stabilizer 2 can be a separate component that is attachable to yet another contact point of the drill system 100, such as a component of the tool 8, such as on the power adapter 16 thereof. In such embodiments, the stabilizer arms 32 extend distally from attachment ends 34 thereof proximate the coupling device 70 to the free ends 36 of the arms 32. The coupling device 70 can be similar to that described above. It should be appreciated, however, that in the present embodiment the collar members 72 are preferably sized so that the inner surfaces 77 thereof generally conform to an outer surface of the power adapter 16 at the coupling location thereof. In other embodiments, the collar members 72 can configured to clamp against objects of various size, such as selectively against the outer surfaces of both the sleeve member 54 and the power adapter 16. Such embodiments can provide the surgeon with further options for attaching and orienting the stabilizer 2 (and thus also the array 24) relative to the medical imager during use.

It should be appreciated that the stabilizers 2 described above have been observed to provide significant advantages during test procedures for drilling the drill bit 10 into a target region of material (such as a test material (e.g., a solidified foam) that approximates various qualities of bone material). One such advantage is that the stabilizer 2 can allow a single surgeon to drill the target location using two hands. For example, with the drill bit 10 inserted within the drill sleeve 4 or sleeve member 54 and with the arms 32 of the stabilizer 2 coupled to the post 30 of the array adapter 18 (and thus also to the array 24), the surgeon can grip the drill sleeve 4/sleeve member 54 with one hand and the tool handle 12 with the other hand. Thus, when making an initial pilot hole, such two-handed gripping allows the surgeon to stabilize the distal end of the instrument assembly with one hand while simultaneously actively steering the proximally-located array (via the tool handle 12) with the other hand. Furthermore, using these grips, the surgeon can position, orient, and actively steer the drill assembly while drilling, with the aid of medical imagery (e.g., CT-scans and/or fluoroscopy), until the central axis X1 corresponds to the target trajectory axis, the array 24 is oriented as desired in the medial imagery view field, and the distal end 5 of the sleeve 4, 54 contacts the target region of bone. From this position, the surgeon can steady the sleeve 4, 54 with the first hand and operate the tool 8 to drive the drill bit 10 with the other hand, such as until the depth-limiting feature(s) have abutted one another, at which time the surgeon can withdraw the tool 8 before or concurrent with withdrawal of the sleeve 4, 54 to withdraw the drill bit 10 from the treatment site. This two-handed operability represents a significant technical advancement over prior art arrayed drilling operations, which typically require two physicians using at least three (3) hands to drill the target location: (1) one hand to grip the sleeve 4, 54; (2) another hand to operate the tool 8; and a (3) third hand to steady the array 24 and/or array adapter 18.

Referring now to FIG. 4B, in another embodiment, that stabilizer 2 can include a stabilizer arm 32 that extends distally from an attachment end 34 thereof proximate the coupling device 70, through a channel 33 in the post 30, and to a free ends 36 of the arm 32 located distally of the post 30. In this manner, the stabilizer arm 32 extending through the channel 33 can collectively stabilize the array adapter 18.

Referring now to FIG. 5, in further embodiments, a surgical drill system can include a single-piece drill guide member and stabilizer 104. In such embodiments, the single-piece drill guide member and stabilizer 104 can be constructed from a monolithic body 105 having a proximal portion 106 configured to receive the array adapter 18 and a distal portion 108 configured to receive the drill region 15 of the drill bit 10. The body 105 can also define an intermediate portion 107 located longitudinally between the proximal and distal portions 107. The proximal and distal portions 106, 108 can be generally cylindrical, and the intermediate portion 107 can have a conical or funnel-like shape.

The proximal portion 106 can define a slot 140 configured to receive and guide movement of the post 30 during use. The slot 140 can have a main portion 144 for guiding longitudinal movement of the post 30 as the drill bit 10 drills into bone. The main portion 144 of the slot 140 has inner surfaces 142 that can snugly engage the post 30 to prevent rotation of the array 24 relative to the single-piece drill guide member and stabilizer 104, similar to the manner described above. The slot 140 can also have a proximal entry portion 146 that is circumferentially offset from the main slot portion 144 for initial docking of the post 30 within the slot 140. The proximal entry portion 146 can have a length configured such that the post 30 reaches the distal end of the entry portion 146 when the drill bit 10 is at a reference position, such as zero insertion depth, with respect to the single-piece drill guide member and stabilizer 104. At such position the body 105 can be rotated so that the post 30 enters the main slot portion 144, at which position a distal-facing shoulder 148 can provide an abutment surface that prevents the post 30 from inadvertently proximally backing out of the main slot portion 144. It should be appreciated that the main slot portion 142 can have indicia, such as the incremental markings and/or bumps described above for providing visual and/or tactile feedback.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. In particular, one or more of the features from the foregoing embodiments can be employed in other embodiments herein. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. A surgical system, comprising:
   a rotational instrument extending along a central axis oriented along a longitudinal direction, the rotational instrument having a proximal end and a distal end, wherein the proximal end is spaced from the distal end in a proximal direction oriented along the longitudinal direction;
   an array adapter attachable to the rotational instrument at a location spaced from the distal end in the proximal direction, wherein the array adapter is configured so that, when attached to the rotational instrument, the rotational instrument is rotatable about the central axis relative to the array adapter, the array adapter configured to carry an array; and
   a guide member defining a cannulation configured to receive a portion of the rotational instrument, wherein the guide member includes a pair of integrated stabilizer arms extending from respective attachment ends to respective free ends spaced from the attachment ends in the proximal direction, the pair of integrated stabilizer arms configured to extend alongside opposite sides of a portion of the array adapter, wherein at least one of the stabilizer arms is configured to resist rotation of the array adapter relative to the guide member about the central axis.

2. The surgical system of claim 1, wherein the guide member comprises a sleeve that defines the cannulation.

3. The surgical system of claim 2, wherein the guide member further comprises a handle member extending outwardly from the sleeve.

4. The surgical system of claim 1, wherein the pair of integrated stabilizer arms are monolithic with the guide member.

5. The surgical system of claim 1, wherein the pair of integrated stabilizer arms are rigidly joined with the guide member.

6. The surgical system of claim 5, wherein the pair of integrated stabilizer arms extend from an extension member that is welded to the guide member.

7. The surgical system of claim 1, wherein the portion of the array adapter comprises a post for connecting the array adapter with the array, wherein a width of the post in a second direction is substantially equivalent to a distance between the pair of integrated stabilizer arms in the second direction, such that the post is snugly received between the pair of integrated stabilizer arms, wherein the second direction is substantially perpendicular to the longitudinal direction.

8. The surgical system of claim 7, wherein the post extends from the array adapter along a third direction that is substantially perpendicular to the second direction and offset from the longitudinal direction.

9. The surgical system of claim 8, wherein the array comprises a plurality of reference markers arranged in a pattern such that the plurality of reference markers are coplanar with each other.

10. The surgical system of claim 1, wherein the free ends of the pair of integrated stabilizer arms flare away from each other.

11. The surgical system of claim 1, wherein at least respective portions of the pair of integrated stabilizer arms extend at a sloped angle relative to the central axis.

12. The surgical system of claim 1, wherein the rotational instrument is a drill bit configured to drill a hole in a target region of bone.

13. The surgical system of claim 1, wherein the rotational instrument is one of a tap, an awl, an awl tap, a reamer, and a screw driver.

14. A surgical system, comprising:
    a rotational instrument extending along a central axis oriented along a longitudinal direction, the rotational instrument having a proximal end and a distal end, wherein the proximal end is spaced from the distal end in a proximal direction oriented along the longitudinal direction;
    an array adapter attachable to the rotational instrument at a location spaced from the distal end in the proximal direction, wherein the array adapter is configured so that, when attached to the rotational instrument, the rotational instrument is rotatable about the central axis relative to the array adapter, the array adapter configured to carry an array; and
    a guide member defining a cannulation configured to receive a portion of the rotational instrument, wherein the guide member includes a pair of integrated stabilizer arms extending from respective attachment ends to respective free ends spaced from the attachment ends in the proximal direction, the pair of integrated stabilizer arms configured to extend alongside opposite sides of a portion of the array adapter, wherein at least one of the stabilizer arms is configured to resist rotation of the array adapter relative to the guide member about the central axis,
    wherein the portion of the array adapter comprises a post for connecting the array adapter with the array, wherein a width of the post in a second direction is substantially equivalent to a distance between the pair of integrated stabilizer arms in the second direction, such that the post is snugly received between the pair of integrated stabilizer arms, wherein the second direction is substantially perpendicular to the longitudinal direction,
    wherein the pair of integrated stabilizer arms define respective first portions and respective second portions, the first portions are located between the attachment ends and the second portions, the distance is a first distance that is substantially constant along the first portions, and the pair of integrated stabilizer arms define a second distance measured between the second portions along the second direction, and the second distance is less than the first distance, such that:
        the post flexes the second portions away from each other as the post is inserted between the pair of integrated stabilizer arms, and
        the second portions flex inwardly toward each other after the post has moved alongside the first portions, thereby resisting back-out of the post from between the pair of integrated stabilizer arms.

15. A surgical system, comprising:
    a rotational instrument extending along a central axis oriented along a longitudinal direction, the rotational instrument having a proximal end and a distal end spaced from the proximal end in a distal direction along the longitudinal direction, the proximal end configured to be rotationally driven about the central axis by a powered tool;

an array adapter attachable to the rotational instrument, wherein the array adapter is configured so that, when attached to the rotational instrument, the rotational instrument is rotatable about the central axis relative to the array adapter, the array adapter configured to carry an array;

a guide member defining a cannulation configured to receive a portion of the rotational instrument, the guide member including a pair of stabilizer arms configured to extend alongside opposite sides of a portion of the array adapter, wherein at least one of the stabilizer arms is configured to resist rotation of the array adapter about the central axis relative to the guide member, wherein the pair of stabilizer arms have opposed inner surfaces that define a slot between the pair of stabilizer arms, the slot extending along the longitudinal direction, wherein the guide member is configured such that the portion of the array adapter and the rotational instrument are translatable along the slot in the distal direction relative to the guide member as the rotational instrument is rotatably driven.

16. The surgical system of claim 15, wherein the inner surfaces of the pair of stabilizer arms are parallel with each other, thereby guiding the portion of the array adapter to translate along within the slot along the longitudinal direction.

17. The surgical system of claim 15, wherein the rotational instrument is a drill bit configured to drill a hole in a target region of bone.

18. The surgical system of claim 15, wherein the rotational instrument is one of a tap, an awl, an awl tap, a reamer, and a screw driver.

* * * * *